United States Patent [19]

Herbes

[11] 4,413,100

[45] Nov. 1, 1983

[54] ALKYLATED METHYLOL MELAMINE RESIN CONDENSATE COMPOSITIONS HAVING LOW FORMALDEHYDE RELEASE

[75] Inventor: William F. Herbes, Bridgewater, N.J.

[73] Assignee: American Cyanamid Company, Stamford, Conn.

[21] Appl. No.: 429,901

[22] Filed: Sep. 30, 1982

[51] Int. Cl.³ .......................... C08G 6/00; C08L 61/02
[52] U.S. Cl. .................................. 525/398; 528/254; 528/256; 524/211
[58] Field of Search ................ 525/398; 528/254, 256; 524/211

[56] References Cited

U.S. PATENT DOCUMENTS

| | | | |
|---|---|---|---|
| 2,662,872 | 12/1953 | Gagarine et al. | 528/256 X |
| 3,351,615 | 11/1967 | Gordon | 528/256 |
| 4,297,264 | 10/1981 | De Ruiter et al. | 528/256 X |

Primary Examiner—Lucille M. Phynes

Attorney, Agent, or Firm—Charles J. Fickey

[57] ABSTRACT

Methylated methylol melamine resin condensate compositions, represented by the empirical formula:

$$MF_{3-4}\ Me_{0.5-3}$$

wherein M represents a melamine moiety, F represents a formaldehyde moiety, and Me represents a methyl group moiety, are combined with from about 5 percent to about 30 percent by weight of urea, based on the resin condensate solids content, to provide modified methylated methylol melamine resin condensate compositions which exhibit a reduced tendency to release formaldehyde into the atmosphere during curing of the textile materials treated therewith or during storage of the treated textile materials during storage at elevated temperatures.

1 Claim, No Drawings

ALKYLATED METHYLOL MELAMINE RESIN CONDENSATE COMPOSITIONS HAVING LOW FORMALDEHYDE RELEASE

The present invention relates to alkylated methylol melamine resin condensate compositions which are useful in the treatment of textile materials, especially polyester, cotton, and polyester/cotton blends. More particularly, it relates to methylated methylol melamine resin condensate compositions which exhibit reduced release of formaldehyde during subsequent curing operations and also from the treated textile materials during storage at elevated temperatures. Still more particularly, it relates to a method for the treatment of textile materials with a methylated methylol melamine resin condensate composition to provide a finish thereon which has a reduced tendency to release formaldehyde during subsequent exposure to elevated temperatures.

Alkylated methylol melamine resin condensates have long been used to provide a finish on textile materials for a variety of purposes. Generally speaking, they are the products of the condensation of 1 molar proportion of melamine with up to 6 molar proportions of formaldehyde, which are then alkylated with up to 6 molar proportions of a lower aliphatic alcohol, such as methanol. Their preparation is exemplified by Suen, U.S. Pat. No. 2,715,619. Hexakis(alkoxymethyl)melamines are the ultimate products of the condensation. Many such products, however, are only partially methylolated and only partially methylated, and find uses in particular applications.

The resin condensates are applied to textile materials by a variety of means and cured (cross-linked) to form an insoluble resin on the treated textile material by the application of heat, usually in the presence of a curing catalyst. During the curing operation, there is frequently an excess amount of formaldehyde released from the resins. This is also apparent during exposure to elevated temperatures during storage of the treated and cured textile material. It is now generally recognized that formaldehyde is a toxic substance, the presence of which should be avoided in the workplace, or at least substantially reduced.

It is an object of the present invention to provide alkylated, particularly methylated, methylol melamine resin condensate compositions which, when applied to textile materials and cured, exhibit a reduced tendency to release formaldehyde into the atmosphere. It is also an object of the invention to provide a method for the preparation of such compositions.

In accordance with the invention, methylated methylol melamine resin condensate compositions, represented by the empirical formula:

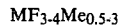

$$MF_{3-4}Me_{0.5-3}$$

wherein M represents a melamine moiety, F represents a formaldehyde moiety, and Me represents a methyl group moiety, are combined with from about 5 percent to about 30 percent by weight of urea, based on the resin condensate solids content, to provide modified methylated methylol melamine resin condensate compositions which exhibit a reduced tendency to release formaldehyde into the atmosphere during curing of the textile materials treated therewith or during storage of the treated textile materials during storage at elevated temperatures.

Although most, if not all, alkylated methylol melamine resin condensates exhibit reduced formaldehyde release when combined with urea, it has been found that those resin condensates represented by the aforementioned empirical formula provide the greatest benefit when applied to polyester, cotton, or polyester/cotton blends.

As can be recognized from the formula, melamine is condensed with formaldehyde to provide methylol melamines having less than the maximum permissible number of methylol groups. All or part of the methylol groups are then alkylated by reaction with an alcohol such as methanol. Thus, the reaction products are mixtures of partially to wholly methylated products which have an average formula, based on chemical analysis, as represented.

The compositions of the invention are applied to the textile materials by standard procedures, as by dipping, padding, spraying, and the like, and the finishes are then converted to an insoluble (cross-linked) resin by heating in the presence of a catalyst. The preferred method of application is by padding the textile material from a pad bath.

The textile materials which can be treated advantageously by the invention may be in the form of fibers, yarn, thread, knitted or woven fabric, as well as nonwoven fabric and batting.

A typical pad bath is an aqueous dispersion or solution containing between about 0.5 percent and 40 percent by weight of the resin condensate. The amount of resin applied to the textile material in the pad bath may be varied, but is usually between about 0.5 percent and 40 percent by weight, based on the weight of textile material. Amounts ranging from about 2.5 percent to about 15 percent are preferable.

The amount of urea used in the compositions ranges from about 5 percent to about 30 percent by weight, based on the solids content of the resin condensate.

The urea may be incorporated into the resin condensate composition by simply adding it to the pad bath along with the resin concentrate. Alternatively, the urea may be incorporated into the resin condensate after it is formed.

The treated textile materials are padded to provide a wet pickup of about 50 percent to 100 percent by weight, and then dried. The dried treated textile material is then cured by heating, preferably in the presence of a catalyst, to effect insolubility of the resin on the substrate. Curing temperatures between about 275° F. and 400° F. and curing times of between about 30 seconds to 20 minutes are conventional. Suitable catalysts include metal salts such as zinc chloride, magnesium chloride, zinc nitrate; ammonium salts, such as ammonium chloride, ammonium sulfate; and organic amine hydrochlorides. Ammonium chloride and magnesium chloride are preferred. The amount of catalyst used will vary depending on the particular catalyst used, but generally will range from about 3 percent to about 15 percent, based on the resin condensate solids. The catalysts are incorporated into the pad bath composition.

The examples which follow further illustrate the invention.

EXAMPLE 1

A kettle is charged with 1400 pounds of 44% formaldehyde, 1893 pounds of methanol, and 2250 pounds of 91% paraformaldehyde. The pH is adjusted to 10.0–10.5, the mixture is heated to 60° C. to dissolve the paraformaldehyde. The pH is again adjusted to 8.0-9.0 and 3160 pounds of melamine are added. The mixture is heated to reflux (78° C.) and held at reflux for 50 minutes. The mixture is then cooled to 771° C. and 8450 pound methanol and 27 pounds oxalic acid are added. The mixture is then heated to reflux (75° C.) and held at reflux for 45 minutes. Finally, 32 pound of 50% sodium hydroxide solution is added and the mixture allowed to cool. Analysis of the resulting product gives the composition corresponding to the empirical formula $MF_{3.3}Me_{1.8-2.0}$.

EXAMPLE 2

Pad baths were prepared containing the methylated methylol melamine resin condensate of Example 1. Urea and ammonium chloride catalyst were added thereto. The pad bath compositions are shown in Table I.

TABLE I

| Exp. No. | Parts Resin "As Is" | Parts Resin Real | $NH_4Cl$ Parts, Real | Urea, Parts |
|---|---|---|---|---|
| 1 | 18 | 14.4 | 0.5 | 0 |
| 2 | 18 | 14.4 | 0.5 | 1 |
| 3 | 18 | 14.4 | 0.5 | 2 |
| 4 | 18 | 14.4 | 0.5 | 4 |

100% Polyester fabric was immersed in the pad baths to about 65% wet pickup to deposit thereon about 9.5% resin solids. The treated fabrics were dried at 100° C. Samples of the dried fabric were charged to a flask and cured for 3 minutes by passing air at 160° C. over them. The air exiting the flask was bubbled into a solution to trap evolved formaldehyde. The solutions were analyzed for formaldehyde content and the amount expressed as micrograms (μg) per gram of treated fabric. Data for the several experiments are given in Table II.

TABLE II

| Exp. No. | Formaldehyde Released (μg per gram fabric) |
|---|---|
| 1 | 886 |
| 2 | 520 |
| 3 | 323 |
| 4 | 97 |

The data illustrate that the amount of formaldehyde released from the fabric during curing decreased with increasing amount of urea added to the resin condensate composition.

EXAMPLE 3

The procedure of Example 2 was followed through the drying step at 100° C. Then, the fabrics were cured for 15 minutes by heating them at 177° C. The treated and cured fabrics were tested for formaldehyde release according to AATCC* Test Method 112-1978, which comprises suspending a 1-gram sample of fabric in a wire basket over 50 ml of water in a jar and incubating the sample in a controlled oven for 20 hours at 49±1° C. Aliquots of the water in the jar are then analyzed for formaldehyde and reported as parts of formaldehyde per million parts of fabric. Data are given in Table III.
*American Association of Textile Chemists and Colorists

TABLE III

| Exp. No. | Formaldehyde Released (ppm) |
|---|---|
| 5 | 8440 |

TABLE III-continued

| Exp. No. | Formaldehyde Released (ppm) |
|---|---|
| 6 | 6550 |
| 7 | 4562 |
| 8 | 2375 |

The data illustrate that the amount of formaldehyde released decreased with increasing amount of urea added to the resin condensate composition.

EXAMPLE 4

The resin condensate of Example 1 was mixed with urea to form clear resin condensate compositions containing the amounts of urea shown in Table IV.

TABLE IV

| Experiment No. | 9 | 10 | 11 | 12 |
|---|---|---|---|---|
| Parts resin condensate (80%) | 400 | 400 | 400 | 400 |
| Parts urea | 0 | 22.2 | 44.4 | 88.9 |
| % Resin solids | 80.0 | 75.8 | 72.0 | 65.5 |
| % Urea | 0 | 5.3 | 10.0 | 18.2 |
| Ratio condensate/urea | — | 18/1 | 18/2 | 18/4 |

Pad baths were prepared, as in Example 2, containing the compositions shown in Table IV. Polyester fabric was padded to deposit thereon 10% real solids. The fabrics were dried at 107° C. for 1 minute and then cured for 1.5 minutes at 177° C. Application to the fabric was made immediately following preparation of the resin condensate compositions and again following aging of the compositions for one and four weeks at room temperature. The fabrics so treated were analyzed for formaldehyde release according to AATCC Test Method 122-1978. Data are given in Table V.

TABLE V

| | Formaldehyde Released (ppm) From Fabric | | |
|---|---|---|---|
| Exp. No. | No Aging | Aged 1 Week | Aged 4 Weeks |
| 9 | 7750 | 9130 | 9500 |
| 10 | 6750 | 6250 | 7063 |
| 11 | 4750 | 4375 | 6250 |
| 12 | 2000 | 2750 | 2713 |

The data illustrate that urea can be incorporated into the resin condensate as well as directly into the pad bath, with essentially equivalent results. The data also show that aging of the resin condensates containing urea does not appreciably affect the amount of formaldehyde released from the fabric.

EXAMPLE 5

Pad baths were prepared in the manner described in Example 2. Both ammonium chloride and magnesium chloride were evaluated as catalysts. The pad baths were used to treat cotton/polyester (35/65), 100% polyester and 100% cotton fabrics. The treated and cured fabrics were tested for formaldehyde release in accordance with AATCC Test Method 112-1978, as described in Example 3. Data are given in Table VI.

TABLE VI

| Exp. No. | Percent Solids Deposited Resin | Percent Solids Deposited Urea | Catalyst | Formaldehyde Released 65/35 PE/Cotton | Formaldehyde Released 100% PE | Formaldehyde Released 100% Cotton |
|---|---|---|---|---|---|---|
| 13 | 10 | 0 | $NH_4Cl$ | 4500 | 5125 | 6500 |
| 14 | 10 | 0.55 | $NH_4Cl$ | 3125 | 4625 | 3500 |
| 15 | 10 | 1.1 | $NH_4Cl$ | 3288 | 2310 | 3638 |
| 16 | 10 | 2.2 | $NH_4Cl$ | 1887 | 1250 | 3575 |
| 17 | 3 | 0 | $MgCl_2$ | 688 | 569 | 1438 |

TABLE VI-continued

| Exp. No. | Percent Solids Deposited Resin | Percent Solids Deposited Urea | Catalyst | Formaldehyde Released 65/35 PE/Cotton | Formaldehyde Released 100% PE | Formaldehyde Released 100% Cotton |
|---|---|---|---|---|---|---|
| 18 | 3 | 0.16 | $MgCl_2$ | 625 | 725 | 1250 |
| 19 | 3 | 0.32 | $MgCl_2$ | 225 | 981 | 900 |
| 20 | 3 | 0.64 | $MgCl_2$ | 150 | 469 | 863 |

I claim:

1. A methylated methylol melamine resin condensate composition exhibiting reduced release of formaldehyde when textile materials treated therewith are exposed to elevated temperatures, which comprises a methylated methylol melamine resin condensate represented by the empirical formula:

$$MF_{3-4}Me_{0.5-3}$$

wherein M represents a melamine moiety, F represents a formaldehyde moiety and Me represents a methyl group moiety, and from about 5 to about 30 percent by weight, based on the resin solids content of said condensate, of urea.

* * * * *